United States Patent
Wang et al.

(10) Patent No.: US 7,660,353 B2
(45) Date of Patent: *Feb. 9, 2010

(54) PICTURE LEVEL ADAPTIVE FRAME/FIELD CODING FOR DIGITAL VIDEO CONTENT

(75) Inventors: Limin Wang, San Diego, CA (US); Krit Panusopone, San Diego, CA (US); Rajeev Gandhi, San Diego, CA (US); Yue Yu, San Diego, CA (US); Ajay Luthra, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 1070 days.

This patent is subject to a terminal disclaimer.

(21) Appl. No.: 11/027,888

(22) Filed: Dec. 30, 2004

(65) Prior Publication Data

US 2005/0117651 A1    Jun. 2, 2005

Related U.S. Application Data

(62) Division of application No. 10/301,203, filed on Nov. 20, 2002.

(60) Provisional application No. 60/333,921, filed on Nov. 27, 2001, provisional application No. 60/351,184, filed on Jan. 22, 2002, provisional application No. 60/395,717, filed on Jul. 12, 2002, provisional application No. 60/395,708, filed on Jul. 12, 2002, provisional application No. 60/395,733, filed on Jul. 12, 2002, provisional application No. 60/395,736, filed on Jul. 12, 2002, provisional application No. 60/395,737, filed on Jul. 12, 2002, provisional application No. 60/396,265, filed on Jul. 15, 2002.

(51) Int. Cl.
*H04N 7/12* (2006.01)

(52) U.S. Cl. .............................. 375/240.12; 375/240.16

(58) Field of Classification Search ............ 375/240.12, 375/240.14, 240.16, 240.15, 240.24; 382/236, 382/243
See application file for complete search history.

(56) References Cited

U.S. PATENT DOCUMENTS

| | | | |
|---|---|---|---|
| 5,122,875 A | 6/1992 | Raychaudhuri et al. | |
| 5,461,420 A | 10/1995 | Yonemitsu et al. | |
| 5,504,530 A * | 4/1996 | Obikane et al. | 375/240.14 |
| 5,539,466 A * | 7/1996 | Igarashi et al. | 375/240.15 |
| 5,565,922 A | 10/1996 | Krause | |
| 5,648,819 A | 7/1997 | Tranchard | |
| 5,786,860 A | 7/1998 | Kim et al. | |
| 5,991,447 A * | 11/1999 | Eifrig et al. | 382/236 |
| 6,307,976 B1 | 10/2001 | Chun et al. | |
| 6,556,718 B1 * | 4/2003 | Piccinelli et al. | 382/236 |
| 6,614,442 B1 | 9/2003 | Ouyang et al. | |

(Continued)

OTHER PUBLICATIONS

P. Borgwardt: "Core Experiment on Interlaced Vido Coding VCEG-N85" ITU-Telecommunications Standardization Sector ITU-T Q.6/SG16 Video Coding Expert Group (VCEG) Sep. 24-27, 2001, pp. 1-10, XP002257037 Santa Barbara, CA USA.

(Continued)

*Primary Examiner*—Gims S Philippe
(74) *Attorney, Agent, or Firm*—Larry T. Cullen

(57) ABSTRACT

A method and system of encoding and decoding digital video content. The digital video content comprises a stream of pictures which can each be intra, predicted, or bi-predicted pictures. Each of the pictures comprises macroblocks that can be further divided into smaller blocks. The method entails encoding and decoding each picture in said stream of pictures in either frame mode or in field mode.

18 Claims, 6 Drawing Sheets

U.S. PATENT DOCUMENTS

| | | |
|---|---|---|
| 6,980,596 B2 | 12/2005 | Wang et al. |
| 2005/0117649 A1 | 6/2005 | Wang et al. |
| 2005/0117651 A1 | 6/2005 | Wang et al. |
| 2005/0152454 A1 | 7/2005 | Wang et al. |
| 2007/0064801 A1 | 3/2007 | Wang et al. |
| 2008/0063075 A1 | 3/2008 | Kondo et al. |

OTHER PUBLICATIONS

"H.26L Test Model Long Term No. 8 (TML-8) Drafto" ITU-T Telecommunication Standarization Sector of ITU, Geneva, CH, Apr. 2, 2001, pp. 1-54, XP001089814 p. 9, paragray 1 -p. 10, paragraph 2.3 p. 39, paragraph 6.1.2.2.1-p. 40.

P. Borgwardt: "Handling Interlaced Video in H.26L VCEG-N57" ITU- Telecommunications Standardization Sector ITU Q.6/SG16 Video Coding Expert Group (VCEG), Sep. 24-27, 2001, pp. 1-3, XP002257142 Santa Barbara, CA, USA.

M. Gallant et al.: "High Rate, High Resolution Video Using H.26L VCEG-N84" IUT-Telecommunications Standardization Sector ITU Q.6/SG16 Video Coding Expert Group (VCEG), Sep. 24-27, 2001, pp. 1-7, XP002257143 Santa Barbara, CA, USA p. 1-p. 3.

"Adaptive field/frame block coding experiment proposal VCEG-76," ITU—Telecommunications Standardization Sector ITU-T Q.6/SG16 Video Coding Expert Group (VCEG), Sep. 24-27, 2001, pp. 1-7, XP002257036, Santa Barbara, CA USA, the whole document.

PCT International Search Report Re: PCT Application #PCT/US02/37593 Nov. 21, 2002.

P. Borgwardt "Core Experiment on Interlaced Video Coding VCEG N85" Sep. 24-27, 2001.

P. Borgwardt "Handling Interlaced Video in H.26L VCEG N57" Sep. 24-27, 2001.

M. Gallant "High Rate, High Resolution Video Using H.26L VCEG N84" Sep. 24-27, 2001.

G. Bjontegaard "H.26L Test Model Long Term No. 8 (TML-8) Drafto" Apr. 2-4, 2001.

* cited by examiner

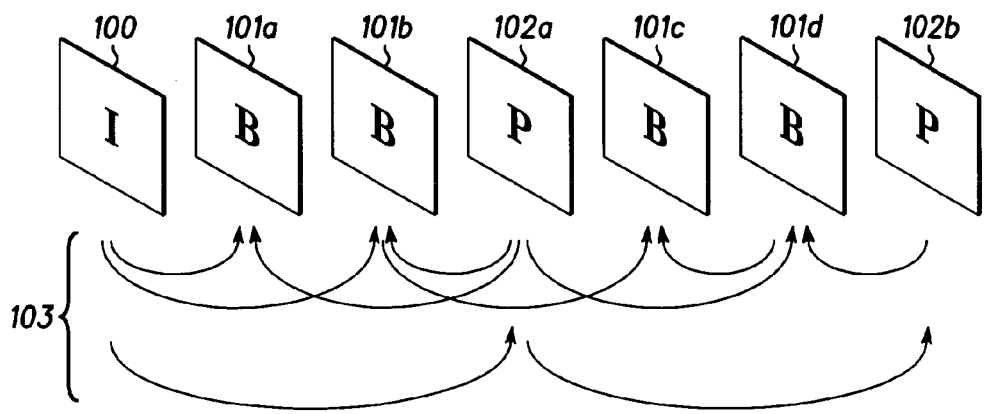
*FIG. 1*
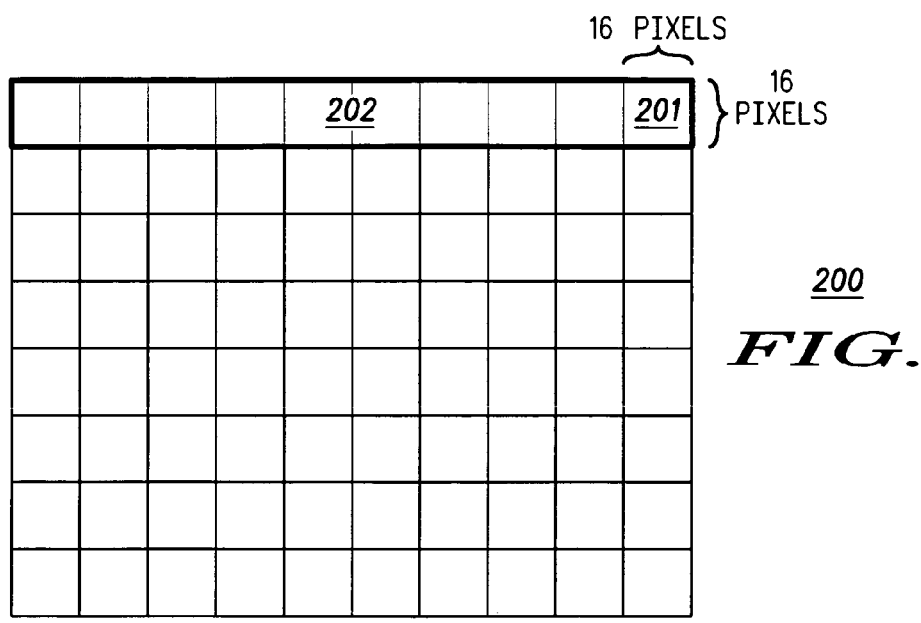
*FIG. 2*
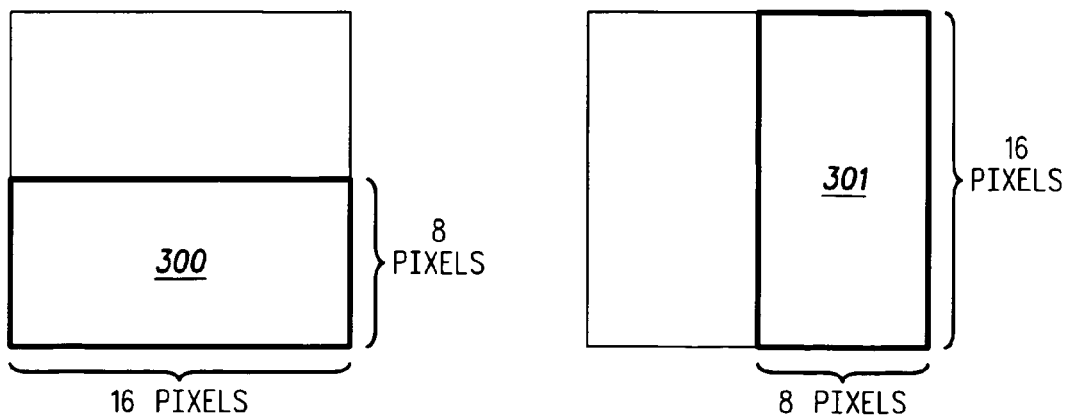
*FIG. 3A*          *FIG. 3B*

PICTURE N-3 (501)　　　PICTURE N-2 (500)

PICTURE N-1 (401)　　　PICTURE N (400)

PICTURE LEVEL ADAPTIVE FRAME/FIELD CODING FOR DIGITAL VIDEO CONTENT

The present application claims priority under 35 U.S.C. §119(e) from the following previously filed Provisional Patent Applications: Ser. No. 60/333,921, filed Nov. 27, 2001; Ser. No. 60/351,184, filed Jan. 22, 2002; Ser. No. 60/395,717 filed Jul. 12, 2002; Ser. No. 60/395,708, filed Jul. 12, 2002; Ser. No. 60/395,733, filed Jul. 12, 2002; Ser. No. 60/395,736, filed Jul. 12, 2002; Ser. No. 60/395,737, filed Jul. 12, 2002; Ser. No. 60/396,265, filed Jul. 15, 2002; all of which are herein incorporated by reference. This application is also a Divisional of U.S. patent application Ser. No. 10/301,203 filed on Nov. 20, 2002, which is herein incorporated by reference.

TECHNICAL FIELD

The present invention relates to encoding and decoding of digital video content. More specifically, the present invention relates to frame mode and field mode encoding and decoding of digital video content at the picture level as used in the MPEG-4 Part 10 AVC/H.264 video coding standard.

BACKGROUND

Video compression is used in many current and emerging products. It is at the heart of digital television set-top boxes (STBs), digital satellite systems (DSSs), high definition television (HDTV) decoders, digital versatile disk (DVD) players, video conferencing, Internet video and multimedia content, and other digital video applications. Without video compression, digital video content can be extremely large, making it difficult or even impossible for the digital video content to be efficiently stored, transmitted, or viewed.

The digital video content comprises a stream of pictures that can be displayed as an image on a television receiver, computer monitor, or some other electronic device capable of displaying digital video content. A picture that is displayed in time before a particular picture is in the "forward direction" in relation to the particular picture. Likewise, a picture that is displayed in time after a particular picture is in the "backward direction" in relation to the particular picture.

Video compression is accomplished in a video encoding, or coding, process in which each picture is encoded as either a frame or as two fields. Each frame comprises a number of lines of spatial information. For example, a typical frame contains 480 horizontal lines. Each field contains half the number of lines in the frame. For example, if the frame comprises 480 horizontal lines, each field comprises 240 horizontal lines. In a typical configuration, one of the fields comprises the odd numbered lines in the frame and the other field comprises the even numbered lines in the frame. The field that comprises the odd numbered lines will be referred to as the "top" field hereafter and in the appended claims, unless otherwise specifically denoted. Likewise, the field that comprises the even numbered lines will be referred to as the "bottom" field hereafter and in the appended claims, unless otherwise specifically denoted. The two fields can be interlaced together to form an interlaced frame.

The general idea behind video coding is to remove data from the digital video content that is "non-essential." The decreased amount of data then requires less bandwidth for broadcast or transmission. After the compressed video data has been transmitted, it must be decoded, or decompressed. In this process, the transmitted video data is processed to generate approximation data that is substituted into the video data to replace the "non-essential" data that was removed in the coding process.

Video coding transforms the digital video content into a compressed form that can be stored using less space and transmitted using less bandwidth than uncompressed digital video content. It does so by taking advantage of temporal and spatial redundancies in the pictures of the video content. The digital video content can be stored in a storage medium such as a hard drive, DVD, or some other non-volatile storage unit.

There are numerous video coding methods that compress the digital video content. Consequently, video coding standards have been developed to standardize the various video coding methods so that the compressed digital video content is rendered in formats that a majority of video encoders and decoders can recognize. For example, the Motion Picture Experts Group (MPEG) and International Telecommunication Union (ITU-T) have developed video coding standards that are in wide use. Examples of these standards include the MPEG-1, MPEG-2, MPEG-4, ITU-T H261, and ITU-T H263 standards.

Most modern video coding standards, such as those developed by MPEG and ITU-T, are based in part on a temporal prediction with motion compensation (MC) algorithm. Temporal prediction with motion compensation is used to remove temporal redundancy between successive pictures in a digital video broadcast.

The temporal prediction with motion compensation algorithm typically utilizes one or two reference pictures to encode a particular picture. A reference picture is a picture that has already been encoded. By comparing the particular picture that is to be encoded with one of the reference pictures, the temporal prediction with motion compensation algorithm can take advantage of the temporal redundancy that exists between the reference picture and the particular picture that is to be encoded and encode the picture with a higher amount of compression than if the picture were encoded without using the temporal prediction with motion compensation algorithm. One of the reference pictures may be in the backward direction in relation to the particular picture that is to be encoded. The other reference picture is in the forward direction in relation to the particular picture that is to be encoded.

However, as the demand for higher resolutions, more complex graphical content, and faster transmission time increases, so does the need for better video compression methods. To this end, a new video coding standard is currently being developed. This new video coding standard is called the MPEG-4 Part 10 AVC/H.264 standard. The new MPEG-4 Part 10 AVC/H.264 standard calls for a number of new methods in video compression. For example, one of the features of the new MPEG-4 Part 10 AVC/H.264 standard is that it allows multiple reference pictures, instead of just two reference pictures. The use of multiple reference pictures improves the performance of the temporal prediction with motion compensation algorithm by allowing the encoder to find the reference picture that most closely matches the picture that is to be encoded. By using the reference picture in the coding process that most closely matches the picture that is to be encoded, the greatest amount of compression is possible in the encoding of the picture. The reference pictures are stored in frame and/or field buffers.

As previously stated, the encoder can encode a picture as a frame or as two fields. A greater degree of compression could be accomplished if, in a sequence of pictures that is to be encoded, some of the pictures are encoded as frames and some of the pictures are encoded as fields.

SUMMARY OF THE INVENTION

In one of many possible embodiments, the present invention provides a method of encoding, decoding, and bitstream generation of digital video content. The digital video content comprises a stream of pictures which can each be intra, predicted, or bi-predicted pictures. Each of the pictures comprises macroblocks that can be further divided into smaller blocks. The method entails encoding and decoding each picture in said stream of pictures in either frame mode or in field mode.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

FIG. 1 illustrates an exemplary sequence of three types of pictures that can be used to implement the present invention, as defined by an exemplary video coding standard such as the MPEG-4 Part 10 AVC/H.264 standard.

FIG. 2 shows that each picture is preferably divided into slices containing macroblocks according to an embodiment of the present invention.

FIG. 3a shows that a macroblock can be further divided into a block size of 16 by 8 pixels according to an embodiment of the present invention.

FIG. 3b shows that a macroblock can be further divided into a block size of 8 by 16 pixels according to an embodiment of the present invention.

Throughout the drawings, identical reference numbers designate similar, but not necessarily identical, elements.

DETAILED DESCRIPTION OF EMBODIMENTS OF THE INVENTION

Figure 3C:
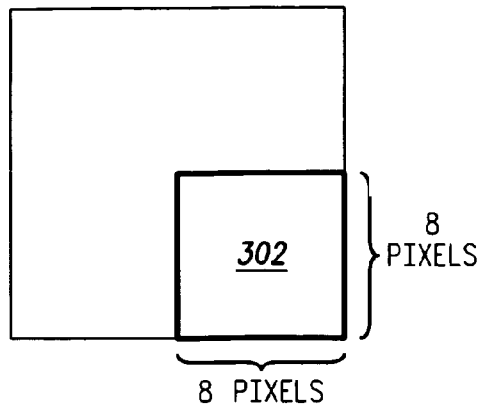
FIG. 3c shows that a macroblock can be further divided into a block size of 8 by 8 pixels according to an embodiment of the present invention.
Figure 3D:
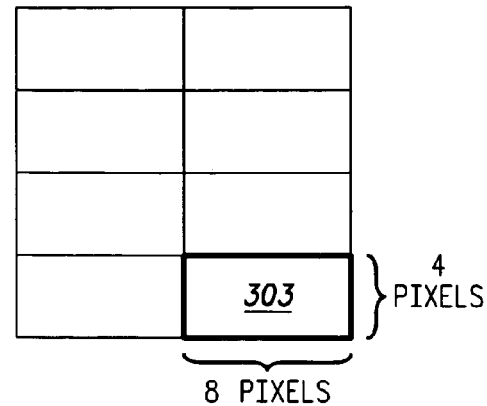
FIG. 3d shows that a macroblock can be further divided into a block size of 8 by 4 pixels according to an embodiment of the present invention.
Figure 3E:
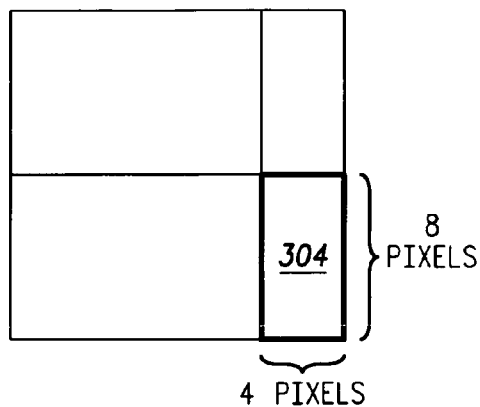
FIG. 3e shows that a macroblock can be further divided into a block size of 4 by 8 pixels according to an embodiment of the present invention.

The present invention provides a method of adaptive frame/field (AFF) coding of digital video content comprising a stream of pictures at a picture level. In AFF coding at a picture level, each picture in a stream of pictures that is to be encoded is encoded in either frame mode or in field mode, regardless of the other picture's frame or field coding mode. If a picture is encoded in frame mode, the two fields that make up an interlaced frame are coded jointly. Conversely, if a picture is encoded in field mode, the two fields that make up an interlaced frame are coded separately. The encoder determines which type of coding, frame mode coding or field mode coding, is more advantageous for each picture and chooses that type of encoding for the picture. The exact method of choosing between frame mode and field mode is not critical to the present invention and will not be detailed herein.

As noted above, the MPEG-4 Part 10 AVC/H.264 standard is a new standard for encoding and compressing digital video content. The documents establishing the MPEG-4 Part 10 AVC/H.264 standard are hereby incorporated by reference, including "Joint Final. Committee Draft (JFCD) of Joint Video Specification" issued by the Joint Video Team (JVT) on Aug. 10, 2002. (ITU-T Rec. H.264 & ISO/IEC 14496-10 AVC). The JVT consists of experts from ISO or MPEG and ITU-T. Due to the public nature of the MPEG-4 Part 10 AVC/H.264 standard, the present specification will not attempt to document all the existing aspects of MPEG-4 Part 10 AVC/H.264 video coding, relying instead on the incorporated specifications of the standard.

Although this method of AFF encoding is compatible with and will be explained using the MPEG-4 Part 10 AVC/H.264 standard guidelines, it can be modified and used as best serves a particular standard or application.

Using the drawings, the preferred embodiments of the present invention will now be explained.

FIG. 1 illustrates an exemplary sequence of three types of pictures that can be used to implement the present invention, as defined by an exemplary video coding standard such as the MPEG-4 Part 10 AVC/H.264 standard. As previously mentioned, the encoder encodes the pictures and the decoder decodes the pictures. The encoder or decoder can be a processor, application specific integrated circuit (ASIC), field programmable gate array (FPGA), coder/decoder (CODEC), digital signal processor (DSP), or some other electronic device that is capable of encoding the stream of pictures. However, as used hereafter and in the appended claims, unless otherwise specifically denoted, the term "encoder" will be used to refer expansively to all electronic devices that encode digital video content comprising a stream of pictures. Also, as used hereafter and in the appended claims, unless otherwise specifically denoted, the term "decoder" will be used to refer expansively to all electronic devices that decode digital video content comprising a stream of pictures.

As shown in FIG. 1, there are preferably three types of pictures that can be used in the video coding method. Three types of pictures are defined to support random access to stored digital video content while exploring the maximum redundancy reduction using temporal prediction with motion compensation. The three types of pictures are intra (I) pictures (100), predicted (P) pictures (102a,b), and bi-predicted (B) pictures (101a-d). An I picture (100) provides an access point for random access to stored digital video content and can be encoded only with slight compression. Intra pictures (100) are encoded without referring to reference pictures.

A predicted picture (102a,b) is encoded using an I, P, or B picture that has already been encoded as a reference picture. The reference picture can be in either the forward or backward temporal direction in relation to the P picture that is being encoded. The predicted pictures (102a,b) can be encoded with more compression than the intra pictures (100).

A bi-predicted picture (101a-d) is encoded using two temporal reference pictures: a forward reference picture and a backward reference picture. The forward reference picture is sometimes called the past reference picture and the backward reference picture is sometimes called a future reference picture. An embodiment of the present invention is that the forward reference picture and backward reference picture can be in the same temporal direction in relation to the B picture that is being encoded. Bi-predicted pictures (101a-d) can be encoded with the most compression out of the three picture types.

Reference relationships (103) between the three picture types are illustrated in FIG. 1. For example, the P picture (102a) can be encoded using the encoded I picture (100) as its reference picture. The B pictures (101a-b) can be encoded using the encoded I picture (100) and/or the encoded P picture (102a) as its reference pictures, as shown in FIG. 1. Under the principles of an embodiment of the present invention, encoded B pictures (101a-d) can also be used as reference pictures for other B pictures that are to be encoded. For example, the B picture (101c) of FIG. 1 is shown with two other B pictures (101b and 101d) as its reference pictures.

The number and particular order of the I (100), B (101a-d), and P (102a,b) pictures shown in FIG. 1 are given as an exemplary configuration of pictures, but are not necessary to implement the present invention. Any number of I, B, and P pictures can be used in any order to best serve a particular application. The MPEG-4 Part 10 AVC/H.264 standard does not impose any limit to the number of B pictures between two reference pictures nor does it limit the number of pictures between two I pictures.

FIG. 2 shows that each picture (200) is preferably divided into slices (202). A slice (202) contains a group of macroblocks (202). A macroblock (201) is a rectangular group of pixels. As shown in FIG. 2, a preferable macroblock (201) size is 16 by 16 pixels.

Figure 3F:
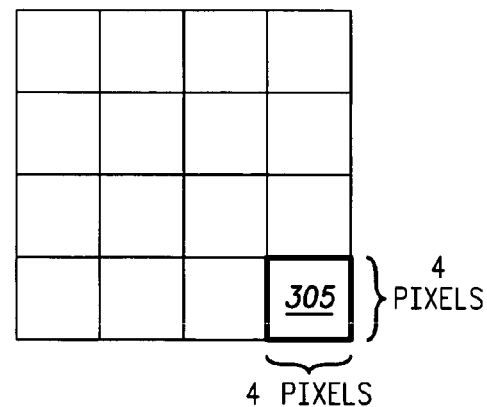
FIG. 3f shows that a macroblock can be further divided into a block size of 4 by 4 pixels according to an embodiment of the present invention.

FIGS. 3a-f show that a macroblock can be further divided into smaller sized blocks. For example, as shown in FIGS. 3a-f, a macroblock can be further divided into block sizes of 16 by 8 pixels (FIG. 3a; 300), 8 by 16 pixels (FIG. 3b; 301), 8 by 8 pixels (FIG. 3c; 302), 8 by 4 pixels (FIG. 3d; 303), 4 by 8 pixels (FIG. 3e; 304), or 4 by 4 pixels (FIG. 3f; 305).

Figure 4:
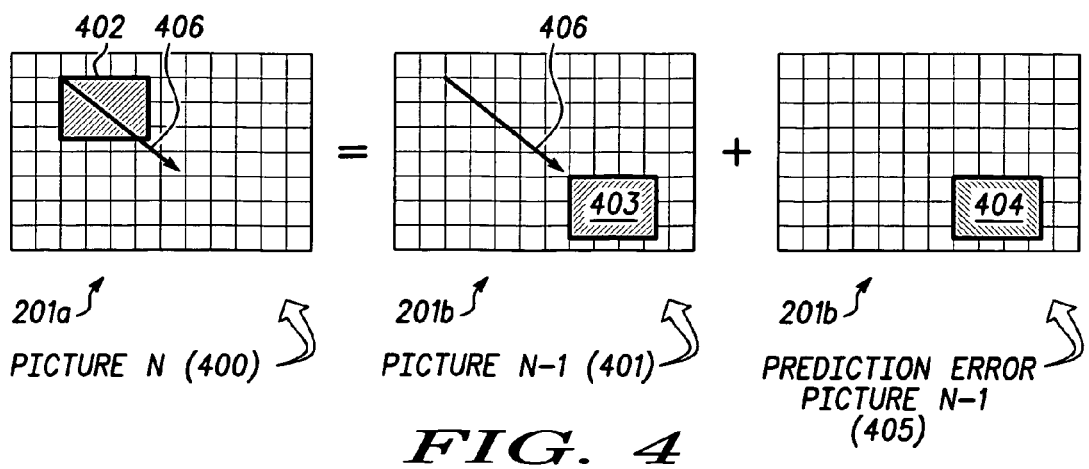
FIG. 4 shows a picture construction example using temporal prediction with motion compensation that illustrates an embodiment of the present invention.

FIG. 4 shows a picture construction example using temporal prediction with motion compensation that illustrates an embodiment of the present invention. Temporal prediction with motion compensation assumes that a current picture, picture N (400), can be locally modeled as a translation of another picture, picture N-1 (401). The picture N-1 (401) is the reference picture for the encoding of picture N (400) and can be in the forward or backwards temporal direction in relation to picture N (400).

As shown in FIG. 4, each picture is preferably divided into slices containing macroblocks (201a,b). The picture N-1 (401) contains an image (403) that is to be shown in picture N (400). The image (403) will be in a different temporal position (402) in picture N (400) than it is in picture N-1 (401), as shown in FIG. 4. The image content of each macroblock (201a) of picture N (400) is predicted from the image content of each corresponding macroblock (201b) of picture N-1 (401) by estimating the required amount of temporal motion of the image content of each macroblock (201b) of picture N-1 (401) for the image (403) to move to its new temporal position (402) in picture N (400). Instead of the original image (402), the difference (404) between the image (402) and its prediction (403) is actually encoded and transmitted.

For each image (402) in picture N (400), the temporal prediction can often be represented by motion vectors that represent the amount of temporal motion required for the image (403) to move to a new temporal position (402) in the picture N (400). The motion vectors (406) used for the temporal prediction with motion compensation need to be encoded and transmitted.

FIG. 4 shows that the image (402) in picture N (400) can be represented by the difference (404) between the image and its prediction and the associated motion vectors (406). The exact method of encoding using the motion vectors can vary as best serves a particular application and can be easily implemented by someone who is skilled in the art.

Figure 5:
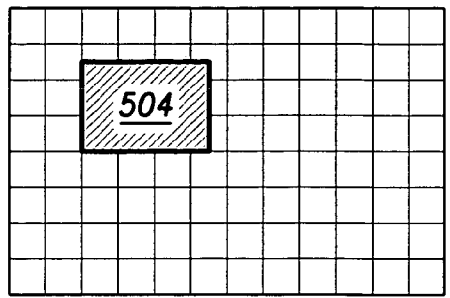
FIG. 5 shows an exemplary stream of pictures which illustrates an advantage of using multiple reference pictures in temporal prediction with motion compensation according to an embodiment of the present invention.
Figure 5:
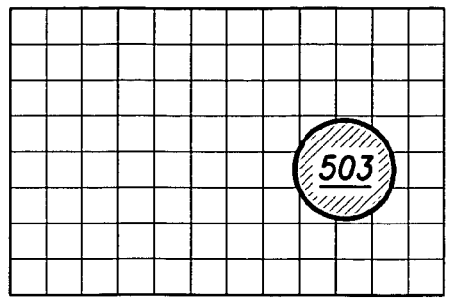
Figure 5:
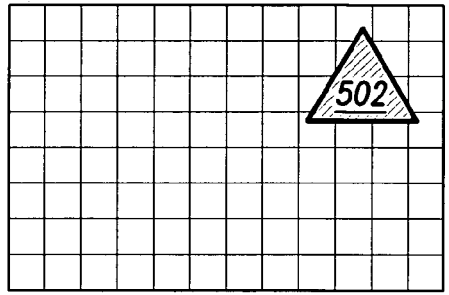
Figure 5:
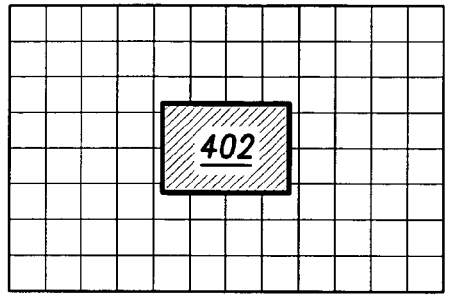

FIG. 5 shows an exemplary stream of pictures which illustrates an advantage of using multiple reference pictures in temporal prediction with motion compensation according to an embodiment of the present invention. The use of multiple reference pictures increases the likelihood that the picture N (400) to be encoded with the most compression possible. Pictures N-1 (401), N-2 (500), and N-3 (501) have been already encoded in this example. As shown in FIG. 5, an image (504) in picture N-3 (501) is more similar to the image (402) in picture N (400) than are the images (503, 502) of pictures N-2 (500) and N-1 (401), respectively. The use of multiple reference pictures allows picture N (400) to be encoded using picture N-3 (501) as its reference picture instead of picture N-1 (401).

Picture level AFF coding of a stream of pictures will now be explained in more detail. A frame of an interlaced sequence contains two fields, the top field and the bottom field, which are interleaved and separated in time by a field period. The field period is half the time of a frame period. In picture level AFF coding, the two fields of an interlaced frame can be coded jointly or separately. If they are coded jointly, frame mode coding is used. Conversely, if the two fields are coded separately, field mode coding is used.

Fixed frame/field coding, on the other hand, codes all the pictures in a stream of pictures in one mode only. That mode can be frame mode or it can be field mode. Picture level AFF is preferable to fixed frame/field coding because it allows the encoder to choose which mode, frame mode or field mode, to encode each picture in the stream of pictures based on the contents of the digital video material.

Figure 6:
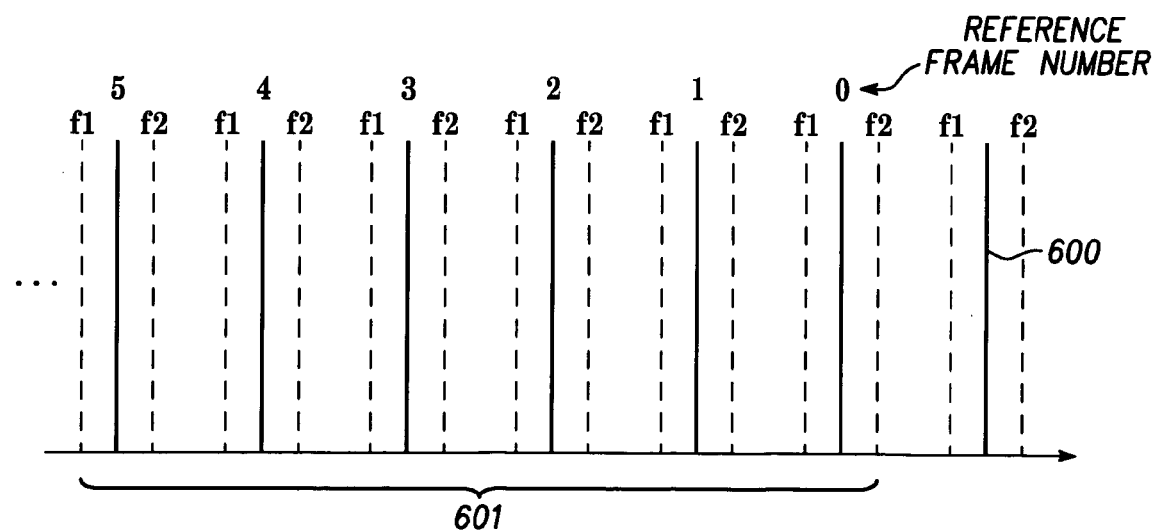
FIG. 6 illustrates according to an embodiment of the present invention that a unique reference frame number is assigned to each reference frame in the frame buffer according to its distance from the current picture that is being encoded in frame mode.

Frame mode coding uses pictures that have already been encoded as reference frames. The reference frames can be any coded I, P, or B frame. The reference frames are stored in a frame buffer, which is part of the encoder. An embodiment of the present invention is that a unique reference frame number is assigned to each reference frame in the frame buffer according to its distance from the current picture that is being encoded in frame mode, as shown in the exemplary configuration of FIG. 6. For example, as shown in FIG. 6, a current picture that is to be encoded as a frame (600) has a number of reference frames (0-5) in the frame buffer (601). Also shown in FIG. 6 are the corresponding fields (f1, f2) to the current frame (600) and the reference frames (0-5). The dotted lines labeled f1 are first fields and the dotted lines labeled f2 are second fields. A first field is the first field that is encoded in a picture of two fields. Likewise, a second field is the second field that is encoded in a picture of two fields. An embodiment of the present invention is that the first field can be either the top or bottom field. In another embodiment of the present invention, the second field can also be either the top or bottom field. The frames are represented by solid lines. As shown in FIG. 6, the reference frame 0 is temporally the closest reference frame to the current frame (600). The reference frame number increases the further the reference frame is temporally from the current frame (600).

Under principles of an embodiment of the present invention, a B picture that is encoded as a frame can have multiple forward and backward reference pictures. Unique numbers are assigned to the forward and backward reference pictures.

In the temporal prediction with motion compensation algorithm, sub-pel interpolation is performed on each of the pixels in a picture that is encoded as a frame. Padding can also be applied to reference pictures encoded as frames by repeating the pixels on the frame boundaries. Padding is sometimes desirable in the temporal prediction with motion compensation algorithm. Loop filtering, or de-blocking schemes, can be applied to frame blocks to account for pixel value discontinuities at the edges of adjacent blocks.

According to another embodiment of the present invention, a macroblock in a P picture can be skipped in AFF coding. If a macroblock is skipped, its data is not transmitted in the encoding of the picture. A skipped macroblock in a P picture is reconstructed by copying the co-located macroblock with motion compensation in the most recently coded I or P reference picture that has been encoded.

Figure 7A:
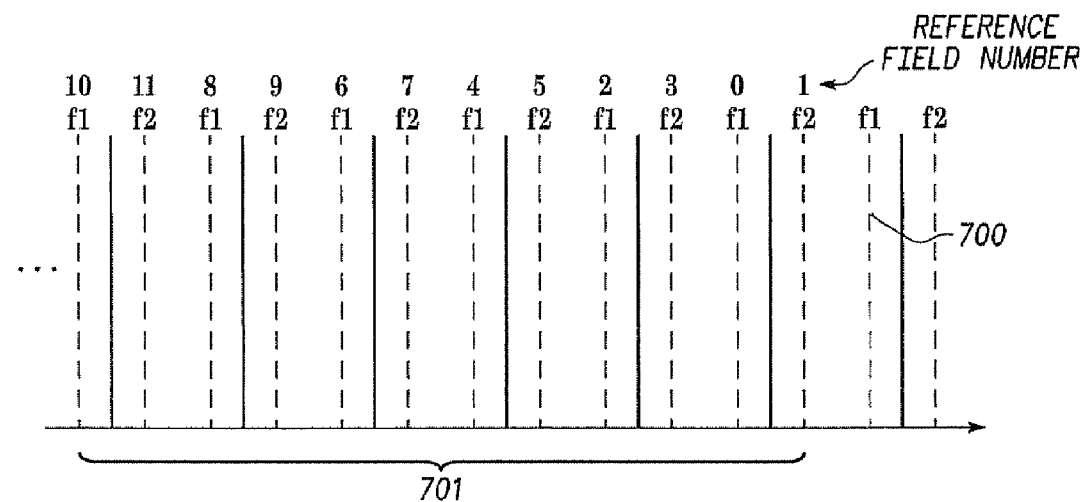
FIG. 7a shows an exemplary reference field numbering configuration where the reference fields of the same field parity as the current field are given smaller numbers than are their corresponding second fields according to an embodiment of the present invention.
Figure 7B:
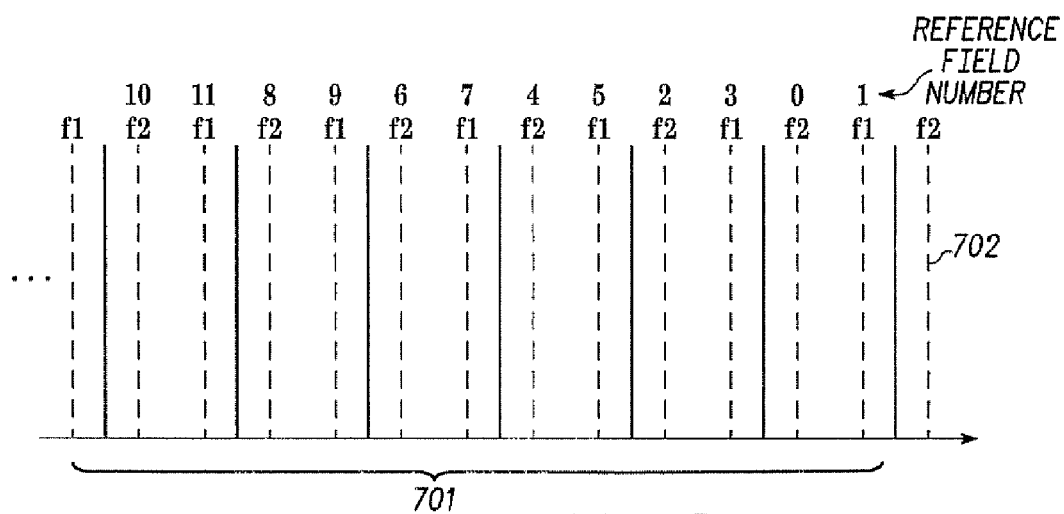
FIG. 7b shows an exemplary reference field numbering configuration where the current field is the second field of the picture that is to be encoded as two fields.

Field mode coding uses pictures that have already been encoded as reference fields. The reference fields can be any coded I, P, or B fields. The reference fields are stored in a field buffer, which is part of the encoder. An embodiment of the present invention is that a unique reference field number is assigned to each reference field in the field buffer according to its distance from the current picture that is being encoded as two fields. FIG. 7a and FIG. 7b show exemplary reference field numbering configurations where the reference fields of the same field parity as the current field are given smaller numbers than are their corresponding second fields according to an embodiment of the present invention. Two fields have the same field parity if they are both top fields or if they are both bottom fields. In the examples of FIG. 7a and FIG. 7b, if the first field of the current picture that is to be encoded is a top field, then the first fields of the reference pictures are top fields as well. The second fields would then be bottom fields. The first fields can also be all bottom fields and the second fields can all be top fields.

As shown in FIG. 7a, a current picture that is to be encoded in field mode has a number of reference fields (0-10) in the field buffer (701). The dotted lines labeled f1 are first fields and the dotted lines labeled f2 are second fields. The corresponding frames to the fields are also shown in FIG. 7a and are represented by solid lines. As shown in FIG. 7a, if the current field (700) is the first field of the picture that is to be encoded, the first field of the first picture in the field buffer (701) is assigned the number 0, while the second field of the first picture in the field buffer (701) is assigned the number 1. The reference field numbers increase the further the reference fields are temporally from the current field (700). The first fields of the pictures in the field buffer have lower reference numbers than do their corresponding second fields.

FIG. 7b shows an exemplary reference field numbering configuration where the current field (702) is the second field of the picture that is to be encoded as two fields. The dotted lines labeled f1 are first fields and the dotted lines labeled f2 are second fields. The first field of the current picture has already been coded. As shown in FIG. 7b, because the current field (702) is a second field, the second field of the first picture in the field buffer (701) is assigned the number 0. The first coded field of the current picture is assigned the number 0. The reference field numbers increase the further the reference fields are temporally from the current field (702). The second fields of the pictures in the field buffer have lower reference numbers than do their corresponding first fields.

Figure 8:
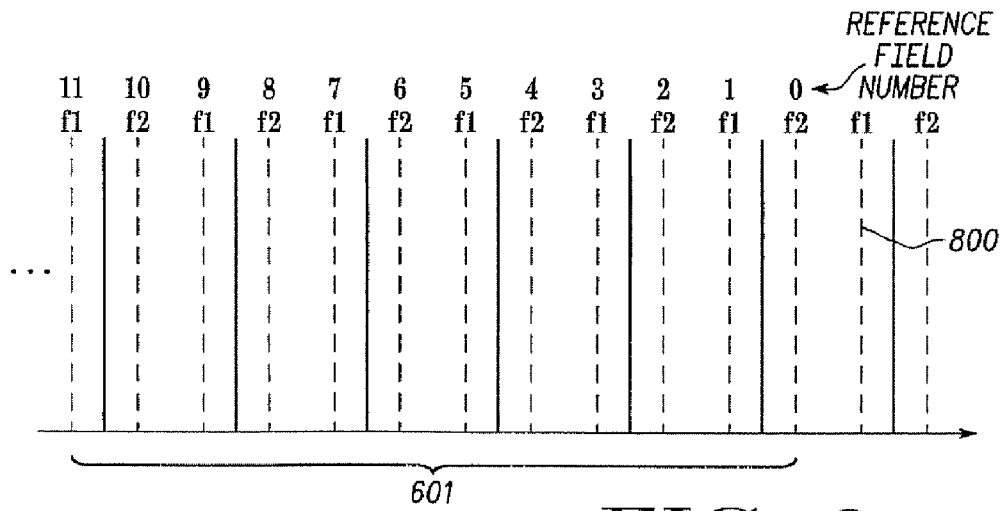
FIG. 8 shows an alternate reference field numbering configuration in the field buffer according to an embodiment of the present invention.

FIG. 8 shows an alternate reference field numbering configuration in the field buffer according to an embodiment of the present invention. In this configuration, no favoring is given to fields of the same field parity as the current field. For example, as shown in FIG. 8, the current field (800) is a first field. The most recently coded field of the most recently coded picture in the field buffer is assigned the reference number 0. The reference field numbers increase the further the reference fields are temporally from the current field (800), regardless of their field parity.

According to another embodiment of the present invention, if field coding is selected by the encoder for a particular P picture, the encoder can use the first field that is encoded as a reference field for the encoding of the second field. If the picture is a B picture, the first field that is encoded can be used as one of the two reference fields for the encoding of the second field.

For adaptive bi-prediction (ABP), the two reference pictures can be coded in field mode. In this case, the temporal distances used in calculating the scaled motion vectors are in field interval. In ABP coding, both the reference pictures are in the same direction.

In the temporal prediction with motion compensation algorithm, sub-pel interpolation is performed on each of the pixels in a picture that is encoded in field mode. Padding can also be applied to reference pictures encoded in field mode by repeating the pixels on the field boundaries. Padding is sometimes desirable in the temporal prediction with motion compensation algorithm. Loop filtering, or de-blocking schemes, can be applied to field blocks to account for pixel value discontinuities at the edges of adjacent blocks.

According to another embodiment of the present invention, a macroblock in a P picture can be skipped in AFF coding. If a macroblock is skipped, its data is not transmitted in the encoding of the picture. A skipped macroblock in a P picture is reconstructed by copying the co-located macroblock with motion compensation in the most recently coded I or P reference field of the same field parity. Another embodiment is that the skipped macroblock in the P picture is reconstructed by copying the co-located macroblock in the most recently coded reference field, which can be of a different field parity.

Another embodiment of the present invention is direct mode coding for B pictures. In direct mode coding, the forward and backward motion vectors for the macroblocks in a B picture are derived from the motion vectors used in the corresponding, or co-located macroblocks of a backward reference picture. Co-located macroblocks in two pictures occupy the same geometric position in both of the pictures. The backward reference picture is sometimes referred to as a forward reference picture, even though according to an embodiment of the present invention, the backward reference picture is not necessarily temporally ahead of the current picture that is being encoded.

Direct mode coding is advantageous over other methods of coding because a macroblock can have up to 16 motion vectors and up to 4 reference frames in inter mode coding. Inter mode coding codes a macroblock using temporal prediction with motion compensation. If a macroblock is coded using inter coding, the MPEG-4 Part 10 AVC/H.264 standard allows each of the six smaller block sizes of FIGS. 3a-f (16 by 8 pixels, 8 by 16 pixels, 8 by 8 pixels, 8 by 4 pixels, 4 by 8 pixels, and 4 by 4 pixels) to have its own motion vector. A block size of 16 by 16 pixels can also have its own motion vector. The MPEG-4 Part 10 AVC/H.264 standard also allows block sizes of 16 by 16 pixels, 16 by 8 pixels, 8 by 16 pixels, and 8 by 8 pixels to have its own reference frame. Thus, a macroblock can have up to 16 motion vectors and up to 4 reference frames. With so many potential motion vectors, it is advantageous to derive the motion vectors of a macroblock that is to be encoded from motion vectors of the backward reference picture's co-located macroblock that are already calculated. In direct mode coding, the forward and backward motion vectors of a macroblock that is to be encoded are computed as the scaled versions of the forward motion vectors of the co-located macroblock in the backward reference picture.

In AFF coding at the picture level, a B picture and its backward reference picture can each be coded in frame mode or in field mode. Hence, in terms of frame and field coding modes, there can be four different combinations for a pair of macroblocks in the B picture and its co-located macroblock of the backward reference picture. In case 1, both the current macroblock and its co-located macroblock are in frame mode. In case 2, both the current macroblock and its co-located macroblock are in field mode. In case 3, the current macroblock is in field mode and its co-located macroblock is in frame mode. Finally, in case 4, the current macroblock is in frame mode and its co-located macroblock is in field mode. The method of direct mode motion vector calculation for the macroblocks that are to be encoded is different in each of the four cases. The four methods of direct motion vector calculation for macroblocks in a B picture will be described in detail below.

Figure 9:
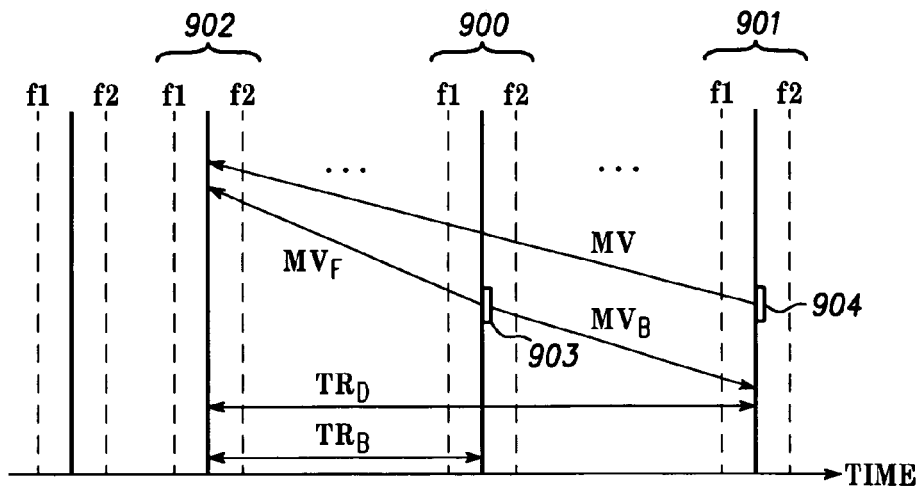
FIG. 9 illustrates a method of direct mode vector calculation where both the current macroblock and its co-located macroblock are in frame mode.

The method of direct mode vector calculation in case 1 will be described in connection with FIG. 9. As shown in FIG. 9, a current B picture (900) is to be encoded in frame mode using a backward reference picture (901) that has been encoded in frame mode and a forward reference picture (902) as its reference pictures. Frames in FIG. 9 are represented with solid vertical lines and their corresponding fields, f1 and f2, are represented with dashed vertical lines. According to an embodiment of the present invention, the backward reference picture (901) can be an I, P, or B picture that has been encoded in frame mode. Similarly, the forward reference picture (902) can also be an encoded I, P, or B picture.

As shown in FIG. 9, there is a block (903) in the current B picture (900) and its co-located block (904) in the backward reference picture (901). The block (903) and the co-located block (904) have equal pixel dimensions. These dimensions can be 16 by 16 pixels, 16 by 8 pixels, 8 by 16 pixels, 8 by 8 pixels, 8 by 4 pixels, 4 by 8 pixels, or 4 by 4 pixels. According to an embodiment of the present invention, the encoder derives two motion vectors for the block (903) in the current B picture (900) that are used in the temporal prediction with motion compensation algorithm. One of the motion vectors, $MV_F$, points to the forward reference picture (902). The other motion vector, $MV_B$, points to the backward reference picture (901) that has been encoded in frame mode. The two motion vectors are calculated by:

$$MV_F = TR_B \cdot MV/TR_D$$

$$MV_B = (TR_B - TR_D) \cdot MV/TR_D \quad \text{(Eqs. 1 and 2)}$$

In Eqs. 1 and 2, $TR_B$ is the temporal distance, approximation of the temporal distance, proportional distance to the temporal distance, or proportional approximation to the approximation of the temporal distance between the current B picture (900) that is to be encoded in frame mode and the forward reference picture (902). $TR_D$ is the temporal distance, approximation of the temporal distance, proportional distance to the temporal distance, or proportional approximation to the approximation of the temporal distance between the forward (902) and backward reference pictures (901) that have been encoded in frame mode. A preferable method of calculating the temporal distances between reference pictures will be explained below. MV is the motion vector that has already been calculated for the co-located block (904) in the backward reference picture (901) and points to the forward reference picture (902).

Figure 10:
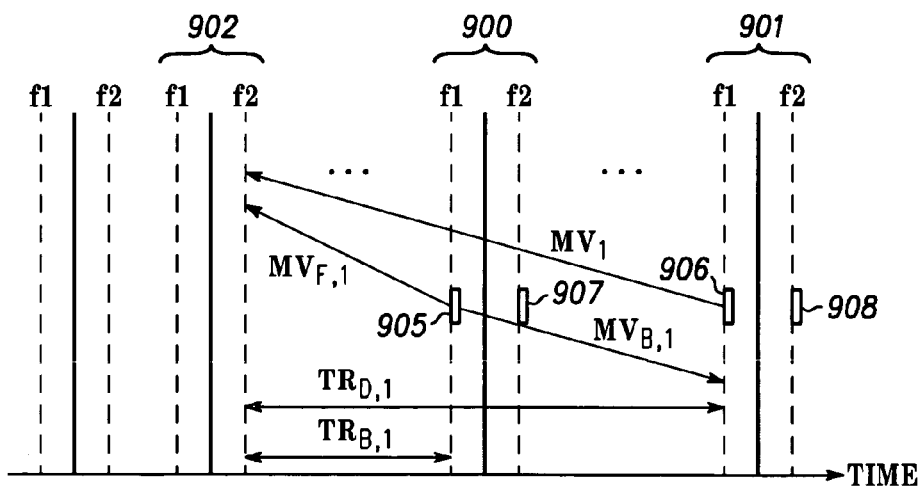
FIG. 10 illustrates a method of direct mode vector calculation where both the current macroblock and its co-located macroblock are in field mode.
Figure 11:
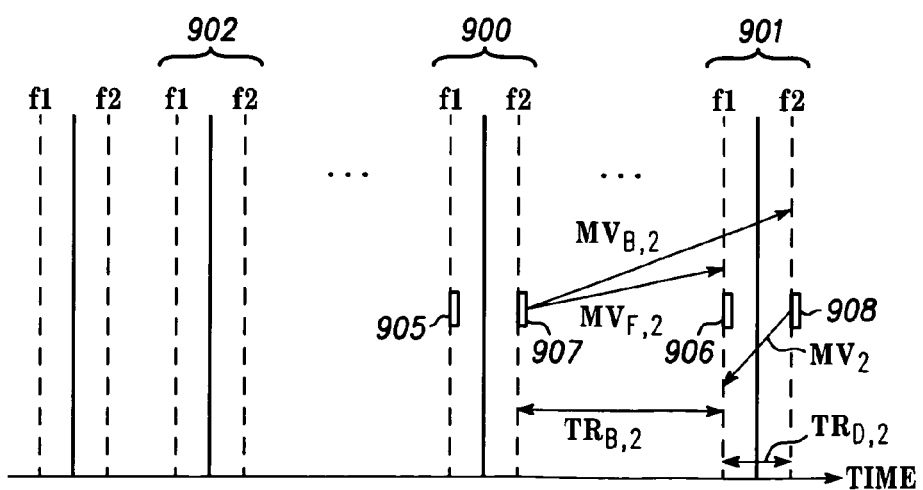
FIG. 11 illustrates another method of direct mode vector calculation where both the current macroblock and its co-located macroblock are in field mode.

The method of direct mode vector calculation in case 2 will be described in connection with FIG. 10 and FIG. 11. As shown in FIG. 10 and FIG. 11, a current B picture (900) is to be encoded in field mode using a backward reference picture (901) that has been encoded in field mode and a forward reference picture (902) as its reference pictures. Frames in FIG. 10 and FIG. 11 are represented with solid vertical lines and their corresponding fields, f1 and f2, are represented with dashed vertical lines. According to an embodiment of the present invention, the backward reference picture (901) can be an I, P, or B picture that has been encoded in field mode. Similarly, the forward reference picture (902) can also be an encoded I, P, or B picture.

As shown in FIG. 10, there is a block (905) in the first field of the current B picture (900). Its motion vectors are derived from the forward motion vector, $MV_1$ of its co-located block (906) in the backward reference picture (901). According to an embodiment shown in FIG. 10, the co-located block (906) is in a field of the same parity as is the block (905) in the current B picture (900). The block (905) and the co-located block (906) have equal pixel dimensions. These dimensions can be 16 by 16 pixels, 16 by 8 pixels, 8 by 16 pixels, 8 by 8 pixels, 8 by 4 pixels, 4 by 8 pixels, or 4 by 4 pixels.

According to an embodiment of the present invention, the encoder derives two motion vectors for the block (905) in the current B picture (900) that are used in the temporal prediction with motion compensation algorithm. One of the motion vectors, $MV_{F,1}$, points to the field in the forward reference picture (902) to which $MV_1$ points. The other motion vector, $MV_{B,1}$, points to the field of the co-located block (906) in the backward reference picture (901). The two motion vectors are calculated by:

$$MV_{F,i} = TR_{B,i} \cdot MV_i / TR_{D,i}$$

$$MV_{B,i} = (TR_{B,i} - TR_{D,i}) \cdot MV_i / TR_{D,i} \quad \text{(Eqs. 3 and 4)}$$

In Eqs. 3 and 4, the subscript, i, is the field index. The first field has a field index of 1 and the second field's field index is 2. Thus, in the exemplary scenario of FIG. 10, the field index is 1 because the first field is being encoded. $MV_i$ is the forward motion vector of the co-located macroblock in field i of the backward reference picture (901). $TR_{B,i}$ is the temporal distance, approximation of the temporal distance, proportional distance to the temporal distance, or proportional approximation to the approximation of the temporal distance between the i-th field of the current B picture (900) and the reference field pointed to by $MV_i$. $TR_{D,i}$ is the temporal distance, approximation of the temporal distance, proportional distance to the temporal distance, or proportional approximation to the approximation of the temporal distance between the i-th field of the backward reference picture (901) and the reference field pointed to by $MV_i$.

As shown in FIG. 10, there is another block (907) in the second field of the current B picture (900). It has a co-located block (908) in the second field of the backward reference picture (901). If the forward motion vector of the co-located block (908) points to a previously coded field in any picture other than its own picture, the calculation of the forward and backward motion vectors follow Eqs. 3 and 4, with the field index equal to 2.

However, according to an embodiment of the present invention, the forward motion vector of the co-located block (908) in the second field of the backward reference picture (901) can also point to the first field of the same backward reference picture (901), as shown in FIG. 11. FIG. 11 shows that the co-located block (908) has a forward motion vector, $MV_2$, that points to the first field of the backward reference picture (901). In this case, the two motion vectors for the current block (907) are calculated as follows:

$$MV_{F,2} = -TR_{B,2} \cdot MV_2 / TR_{D,2}$$

$$MV_{B,2} = -(TR_{B,2} + TR_{D,2}) \cdot MV_2 / TR_{D,2} \quad \text{(Eqs. 5 and 6)}$$

In Eqs. 5 and 6, $TR_{B,2}$ is the temporal distance, approximation of the temporal distance, proportional distance to the temporal distance, or proportional approximation to the approximation of the temporal distance between the second field of the current B picture (900) and the reference field pointed to by $MV_2$. $TR_{D,2}$ is the temporal distance, approximation of the temporal distance, proportional distance to the temporal distance, or proportional approximation to the approximation of the temporal distance between the second field of the backward reference picture (901) and the reference field pointed to by $MV_2$. In this case, as shown in FIG. 11, both motion vectors point in the backward direction.

Figure 12:
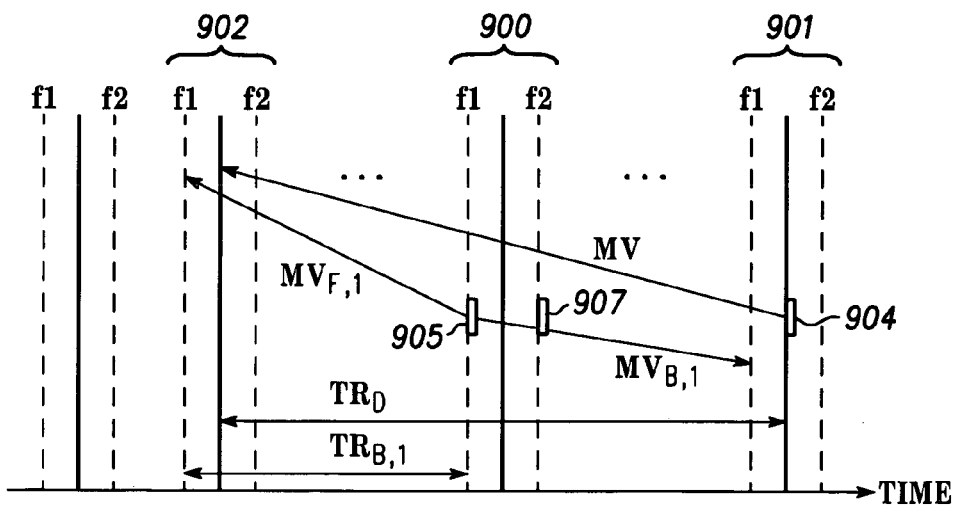
FIG. 12 illustrates a method of direct mode vector calculation where the current macroblock is in field mode and its co-located macroblock is in frame mode.

The method of direct mode vector calculation in case 3 will be described in connection with FIG. 12. As shown in FIG. 12, a current B picture (900) is to be encoded in field mode using a backward reference picture (901) that has been encoded in frame mode and a forward reference picture (902) as its reference pictures. Frames in FIG. 12 are represented with solid vertical lines and their corresponding fields, f1 and f2, are represented with dashed vertical lines. According to an embodiment of the present invention, the backward reference picture (901) can be an I, P, or B picture that has been encoded in frame mode. Similarly, the forward reference picture (902) can also be an encoded I, P, or B picture.

As shown in FIG. 12, there is a block (905) in the first field of the current B picture (900). According to an embodiment shown in FIG. 12, the co-located block (904) is coded in frame mode. According to an embodiment of the present invention, the encoder derives two motion vectors for the block (905) in the current B picture (900) that are used in the temporal prediction with motion compensation algorithm. As shown in FIG. 12, one of the motion vectors, $MV_{F,1}$, points to the field in the forward reference picture (902) that has the same parity as the current block's (905) field parity. In the example of FIG. 12, the current block (905) is in the first field of the current B picture (900). The other motion vector, $MV_{B,1}$, points to the field of similar parity in the backward reference picture (901). The two motion vectors are calculated by:

$$MV_{F,i} = TR_{B,i} \cdot MV_i / TR_D$$

$$MV_{B,i} = (TR_{B,i} - TR_D) \cdot MV_i / TR_D \quad \text{(Eqs. 7 and 8)}$$

In Eqs. 7 and 8, MV is derived by dividing the frame-based forward motion vector of the co-located block (904) by two in the vertical direction. This compensates for the fact that the co-located block (904) is in frame mode while the current block (905) is in field mode. The subscript, i, is the field index. The first field has a field index of 1 and the second field's field index is 2. Thus, in the exemplary scenario of FIG. 12, the field index is 1 because the first field is being encoded. $TR_D$ is the temporal distance, approximation of the temporal distance, proportional distance to the temporal distance, or proportional approximation to the approximation of the temporal distance between the i-th field of the backward reference picture (901) and the i-th field of the forward reference frame (902). $TR_{B,i}$ is the temporal distance, approximation of the temporal distance, proportional distance to the temporal distance, or proportional approximation to the approximation of the temporal distance between the i-th field of the current B picture (900) and the i-th field of the reference frame of the co-located block (904) in the backward reference picture (901). The same equations are used to calculate the motion vectors for the block (907) in the second field of the current B picture (900).

Figure 13:
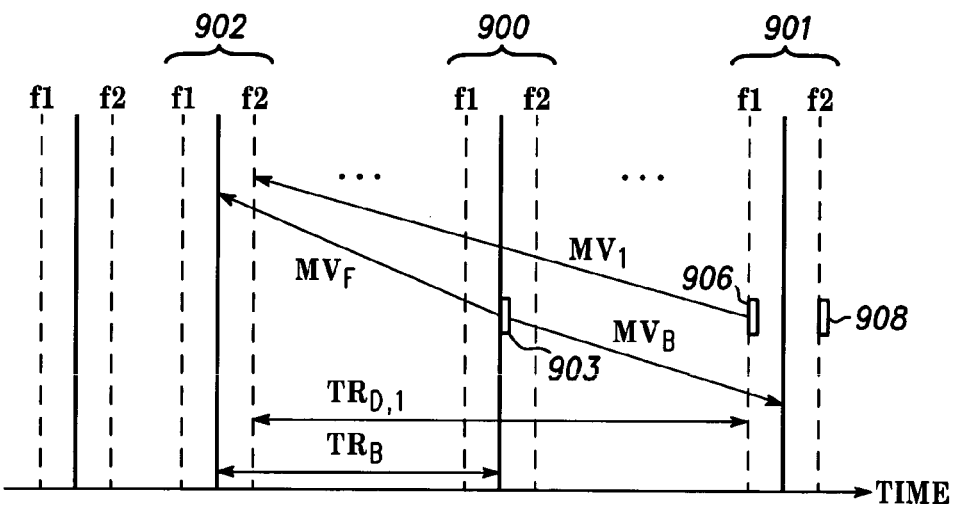
FIG. 13 illustrates a method of direct mode vector calculation where the current macroblock is in frame mode and its co-located macroblock is in field mode.

The method of direct mode vector calculation in case 4 will be described in connection with FIG. 13. As shown in FIG. 13, a current B picture (900) is to be encoded in frame mode using a backward reference picture (901) that has been encoded in field mode and a forward reference picture (902) as its reference pictures. Frames in FIG. 13 are represented with solid vertical lines and their corresponding fields, f1 and f2, are represented with dashed vertical lines. According to an embodiment of the present invention, the backward reference picture (901) can be an I, P, or B picture that has been encoded in field mode. Similarly, the forward reference picture (902) can also be an encoded I, P, or B picture.

As shown in FIG. 13, there is a block (903) in the current B picture (900) that is to be encoded as a frame. Its motion vectors are derived from the forward motion vector, $MV_1$, of its co-located block (906) in the backward reference picture (901). According to an embodiment of the present invention, the encoder derives two motion vectors for the current block (903) in the current B picture (900) that are used in the temporal prediction with motion compensation algorithm. The two motion vectors are calculated as follows:

$$MV_F = TR_B \cdot MV_1 / TR_{D,1}$$

$$MV_B = (TR_B - TR_{D,1}) \cdot MV_1 / TR_{D,1} \quad \text{(Eqs. 9 and 10)}$$

In Eqs. 9 and 10, $MV_1$ is derived by doubling the field-based motion vector of the co-located block (906) in the first field of the backward reference picture (901) in the vertical direction. $TR_B$ is the temporal distance, approximation of the temporal distance, proportional distance to the temporal distance, or proportional approximation to the approximation of the temporal distance between the current B picture (900) and the reference frame (902) with one of its fields pointed by the forward motion vector of the co-located block (906). In FIG. 13, this motion vector is labeled $MV_1$. $TR_{D,1}$ is the temporal distance, approximation of the temporal distance, proportional distance to the temporal distance, or proportional approximation to the approximation of the temporal distance between the first field of the backward reference picture (901) and the field in the forward reference picture (902) pointed by the forward motion vector of the co-located block (906).

Another embodiment of the present invention extends direct mode coding to P pictures. In AFF coding at the picture level, a P picture and its forward reference picture can be coded in frame mode or in field mode. Hence, in terms of frame and field coding modes, there can be four different combinations for a pair of macroblocks in the P picture and its co-located macroblock of the forward reference picture. In case 1, both the current macroblock and its co-located macroblock are in frame mode. In case 2, both the current macroblock and its co-located macroblock are in field mode. In case 3, the current macroblock is in field mode and its co-located macroblock is in frame mode. Finally, in case 4, the current macroblock is in frame mode and its co-located macroblock is in field mode. Blocks in P pictures only have one motion vector, a forward motion vector. The method of direct mode motion vector calculation for the macroblocks that are to be encoded is different in each of the four cases. The four methods of direct motion vector calculation for macroblocks in a P picture will be described in detail below.

In case 1, both the current P picture and its forward reference picture are encoded in frame mode. The forward reference picture for a block in the current P picture has the same picture used by its co-located block in the forward reference picture. The forward motion vector, $MV_F$, of the current block is the same as the forward motion vector of its co-located block.

In case 2, both the current P picture and its forward reference picture are encoded in field mode. The motion vector in direct mode coding of a block in a field of the current P picture is calculated from the forward motion vector of the co-located block in the field with the same parity in the forward reference picture. The forward motion vector, $MV_{F,i}$, for the block in the i-th field of the current P picture is the same as the forward motion vector of its co-located block in the i-th field of the forward reference picture.

In case 3, the current P picture is in field mode and the forward reference picture is in frame mode. Since the co-located block of a block in one of the fields of the current P picture is frame coded, the forward motion vector of a block in one of the fields of the current P picture is derived by dividing the co-located block's motion vector by two in the vertical direction.

In case 4, the current P picture is in frame mode and the forward reference picture is in field mode. The co-located block in the first field of the forward reference picture is used in calculating the forward motion vector of the block in the current P picture that is in frame mode. The forward motion vector, $MV_F$, of a block in the current P picture in frame mode is derived by doubling the field-based motion vector of the co-located block in the first field of the forward reference picture in the vertical direction.

Figure 14:
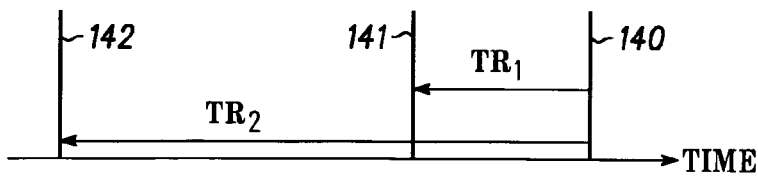
FIG. 14 shows a B picture with its two reference pictures in the temporal forward direction according to an embodiment of the present invention.
Figure 15:
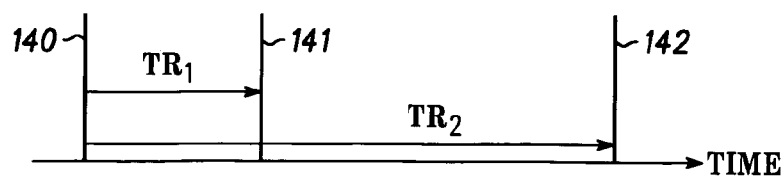
FIG. 15 shows a B picture with its two reference pictures in the temporal backward direction according to an embodiment of the present invention.
Figure 16:
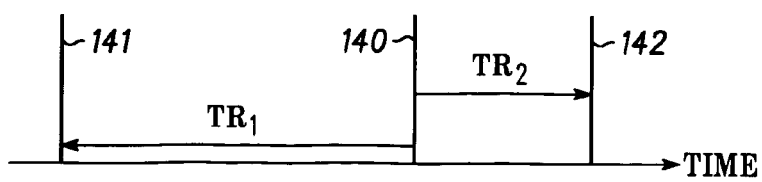
FIG. 16 shows a B picture with a forward reference picture in the temporal forward direction and a backward reference picture in the temporal backward direction.

Another embodiment of the present invention is multi-frame interpolative prediction mode (MFIP). MFIP is a general frame interpolative prediction framework. As explained previously, a B picture that is encoded in frame mode or field mode has two reference pictures that are encoded in frame mode or field mode. The two reference pictures can be both forward reference pictures, as shown in FIG. 14. FIG. 14 shows a B picture (140) that is to be encoded that has two reference pictures. One of the reference pictures is a forward reference picture (141) and the other is a backward reference picture (142). As shown in FIG. 14, they are both in the same temporal forward direction. The two reference pictures can also both be in the temporal backward direction, as shown in FIG. 15. In FIG. 15, the B picture (140) has both its forward reference picture (141) and its backward reference picture (142) in the temporal backward direction. FIG. 16 shows another embodiment of the present invention. As shown in FIG. 16, the B picture (140) can have the forward reference picture (141) in the temporal forward direction and the backward reference picture (142) in the temporal backward direction.

In MFIP, a prediction signal is a linear interpolation of motion compensated signals. The prediction signal (pred) in MPIF of a B picture is calculated as:

$$pred = w_1 ref_1 + w_2 ref_2 + d \qquad \text{(Eq. 11)}$$

In Eq. 11, the variables $ref_1$ and $ref_2$ are the two reference pictures. The variables $w_1$ and $w_2$ are weighting factors. The variable d is set to zero by default. The linear interpolation coefficients $w_1$, $w_2$, d can be determined explicitly for each macroblock. The reference picture, $ref_1$, is the reference picture closer to the B picture in terms of temporal distance if both $ref_1$ and $ref_2$ are forward or backward reference pictures. For bi-directional reference pictures, $ref_1$ and $ref_2$ are the forward and backward reference pictures, respectively.

Both motion vectors of a MFIP macroblock are coded relative to each other. The motion vector of $ref_2$, $MV_2$, is generated by adding an offset DMV to the scaled motion vector of $ref_1$, $MV_1$ using the following equation:

$$MV_2 = \frac{TR_2 \times MV_1}{TR_1} + DMV \qquad \text{(Eq. 12)}$$

In Eq. 12, the variable DMV is the delta motion vector and is an offset. The variables $TR_1$ and $TR_2$ are the temporal distances, approximation of the temporal distance, proportional distance to the temporal distance, or proportional approximation to the approximation of the temporal distance between the current picture and the nearest reference picture, $ref_1$, and the farthest reference picture, $ref_2$, respectively.

In picture level AFF, a B picture can be coded as one B frame picture or two B field pictures. Rules for handling MFIP in field mode, with the current B picture that is to be encoded in field structure are given below:

Eq. 11 is used to generate prediction signal. However, $ref_1$ and $ref_2$ are the fields that are indexed by reference field numbers, ref_idx_fwd and ref_idx_bwd. The fields $ref_1$ and $ref_2$ can be either top or bottom fields. The default weighting factors, $w_1$ and $w_2$, are (0.5, 0.5, 0) and (2, −1, 0), respectively.

Equation 12 is used to generate $MV_2$. Since both reference pictures are in field structure, $TR_1$ and $TR_2$ are determined based on the temporal distances between the reference and the current fields.

Code number for reference field number, ref_idx_fwd and ref_idx_bwd, in MFIP mode follow the known and normal convention for field picture.

The temporal distance between pictures in AFF coding can be calculated using a variable, temporal reference (TR) or by counting the picture numbers and calculating their differences. An embodiment of the present invention is that TR is incremented by 1 per field, and wrapped by a constant (for example, 256) for picture level AFF. TR is in field interval. Let n be the frame index or the frame number. The variable n is incremented by 1 per frame. If a frame with frame index n is encoded in frame mode, the TR of this frame is 2n. If a frame with frame index n is encoded in field mode, the TR of the first field of this frame is 2n and the TR of the second field is 2n+1.

The preceding description has been presented only to illustrate and describe embodiments of invention. It is not intended to be exhaustive or to limit the invention to any precise form disclosed. Many modifications and variations are possible in light of the above teaching.

The foregoing embodiments were chosen and described in order to illustrate principles of the invention and some practical applications. The preceding description enables others skilled in the art to utilize the invention in various embodiments and with various modifications as are suited to the particular use contemplated. It is intended that the scope of the invention be defined by the following claims.

What is claimed is:

1. A method of encoding an image sequence having a plurality of pictures, wherein at least one of said plurality of pictures is a current picture comprising a pair of current fields to be encoded as a bi-predictive coded (B) picture, wherein each of said current fields is divided into at least a plurality of macroblocks, comprising:

at an encoder:
selectively encoding at least one of said plurality of pictures in a frame coding mode;
selectively encoding at least one of said plurality of pictures in a field coding mode; and
computing a first motion vector and a second motion vector that are derived from two associated reference fields for each of said macroblocks, wherein said second motion vector is computed using an offset that is applied to said first motion vector.

2. The method of claim 1, wherein weights are applied to said two associated reference fields.

3. The method of claim 1, wherein said second motion vector is computed as follows:

$$MV_2 = \frac{TR_2 \times MV_1}{TR_1} + DMV$$

where $MV_2$ is said second motion vector, where $MV_1$ is said first motion vector, where DMV is said offset, where $TR_1$ and $TR_2$ are temporal distances between said current picture and said two associated reference fields.

4. An apparatus for encoding an image sequence having a plurality of pictures, wherein at least one of said plurality of pictures is a current picture comprising a pair of current fields to be encoded as a bi-predictive coded (B) picture, wherein each of said current fields is divided into at least a plurality of macroblocks, comprising:

selectively encoding at least one of said plurality of pictures in a frame coding mode;
selectively encoding at least one of said plurality of pictures in a field coding mode; and
computing a first motion vector and a second motion vector that are derived from two associated reference fields for each of said macroblocks, wherein said second motion vector is computed using an offset that is applied to said first motion vector.

5. The apparatus of claim 4, wherein weights are applied to said two associated reference fields.

6. The apparatus of claim 4, wherein said second motion vector is computed as follows:

$$MV_2 = \frac{TR_2 \times MV_1}{TR_1} + DMV$$

where $MV_2$ is said second motion vector, where $MV_1$ is said first motion vector, where DMV is said offset, where $TR_1$ and $TR_2$ are temporal distances between said current picture and said two associated reference fields.

7. A method of decoding an image sequence having a plurality of encoded pictures from a bitstream, wherein an encoded current picture comprising a pair of current fields is encoded as a bi-predictive coded (B) picture and where each of said current fields is divided into a plurality of macroblocks, comprising:

at a decoder;
decoding at least one of said plurality of pictures in a frame coding mode and at least one of said plurality of pictures in a field coding mode; where said decoding applies a first motion vector and a second motion vector that are derived from two associated reference fields for each of said macroblocks, wherein said second motion vector is computed using an offset that is applied to said first motion vector; and
using said plurality of decoded pictures to construct the image sequence.

8. The method of claim 7, wherein weights are applied to said two associated reference fields.

9. The method of claim 7, wherein said second motion vector is computed as follows:

$$MV_2 = \frac{TR_2 \times MV_1}{TR_1} + DMV$$

where $MV_2$ is said second motion vector, where $MV_1$ is said first motion vector, where DMV is said offset, where $TR_1$ and $TR_2$ are temporal distances between said current picture and said two associated reference fields.

10. The method of claim 9, wherein each of said temporal distances is an approximation of the temporal distance, proportional distance to the temporal distance, or proportional approximation to the approximation of the temporal distance between said current picture and one of said two associated reference fields.

11. The method of claim 9,
wherein each of said temporal distances is incremented by 1 per field in field coding mode; and
wherein each of said temporal distances is incremented by 1 per frame for a variable n in frame coding mode, where n is a frame number.

12. The method of claim 7, wherein each of said two associated reference fields is either a top field or a bottom field.

13. An apparatus for decoding an image sequence having a plurality of encoded pictures from a bitstream, wherein an encoded current picture comprising a pair of current fields is encoded as a bi-predictive coded (B) picture and where each of said current fields is divided into a plurality of macroblocks, comprising:

means for decoding at least one of said plurality of pictures in a frame coding mode and at least one of said plurality of pictures in a field coding mode; where said decoding applies a first motion vector and a second motion vector that are derived from two associated reference fields for each of said macroblocks, wherein said second motion vector is computed using an offset that is applied to said first motion vector; and means for using said plurality of decoded pictures to construct the image sequence.

14. The apparatus of claim 13, wherein weights are applied to said two associated reference fields.

15. The apparatus of claim 13, wherein said second motion vector is computed as follows:

$$MV_2 = \frac{TR_2 \times MV_1}{TR_1} + DMV$$

where $MV_2$ is said second motion vector, where $MV_1$ is said first motion vector, where DMV is said offset, where $TR_1$ and $TR_2$ are temporal distances between said current picture and said two associated reference fields.

16. The apparatus of claim 15, wherein each of said temporal distances is an approximation of the temporal distance, proportional distance to the temporal distance, or proportional approximation to the approximation of the temporal distance between said current picture and one of said two associated reference fields.

17. The apparatus of claim 15, wherein each of said temporal distances is incremented by 1 per field in field coding mode; and wherein each of said temporal distances is incremented by 1 per frame for a variable n in frame coding mode, where n is a frame number.

18. The apparatus of claim 13, wherein each of said two associated reference fields is either a top field or a bottom field.

\* \* \* \* \*